United States Patent
Mignot (10) Patent No.: US 9,462,409 B2
(45) Date of Patent: Oct. 4, 2016

(54) MOBILE UNIT FOR CONTROLLING THE COMFORT AND/OR SECURITY CONDITIONS IN A BUILDING

(71) Applicant: SOMFY SAS, Cluses (FR)

(72) Inventor: Pierre Mignot, Chateauroux-les-Alpes (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/426,456

(22) PCT Filed: Sep. 6, 2013

(86) PCT No.: PCT/EP2013/068464
§ 371 (c)(1),
(2) Date: Mar. 6, 2015

(87) PCT Pub. No.: WO2014/037499
PCT Pub. Date: Mar. 13, 2014

(65) Prior Publication Data
US 2015/0304795 A1    Oct. 22, 2015

(30) Foreign Application Priority Data
Sep. 6, 2012  (FR) ...................... 12 58346

(51) Int. Cl.
| | |
|---|---|
| *H04W 4/00* | (2009.01) |
| *H04W 12/08* | (2009.01) |
| *H04W 4/22* | (2009.01) |
| *H04L 12/28* | (2006.01) |
| *H04W 84/10* | (2009.01) |
| *H04W 88/02* | (2009.01) |

(52) U.S. Cl.
CPC .......... *H04W 4/005* (2013.01); *H04L 12/2803* (2013.01); *H04L 12/2814* (2013.01); (Continued)

(58) Field of Classification Search
CPC ......... H04W 8/18; H04W 4/02; H04W 4/12; H04W 12/08; H04W 4/005; H04W 4/22; H04W 84/10; H04W 88/02; H04M 2207/18; H04M 1/72522; H04L 29/08108; H04L 29/08756; H04L 12/2803; H04L 12/2814; H04L 12/2818; H04L 12/2825; H04L 12/2827; G06Q 30/02
See application file for complete search history.

(56) References Cited

U.S. PATENT DOCUMENTS

| | | | |
|---|---|---|---|
| 6,192,282 B1 * | 2/2001 | Smith | G05B 15/02 340/12.53 |
| 6,990,335 B1 * | 1/2006 | Shamoon | G01D 21/00 455/410 |

(Continued)

FOREIGN PATENT DOCUMENTS

| | | |
|---|---|---|
| EP | 2071731 A2 | 6/2009 |
| WO | 99/17477 A2 | 4/1999 |
| WO | 2007/114716 A1 | 10/2007 |

OTHER PUBLICATIONS

International Search Report and Written Opinion dated Oct. 7, 2013, issued in corresponding application No. PCT/EP2013/068464; with English partial translation and partial machine-translation.

*Primary Examiner* — Kashif Siddiqui
(74) *Attorney, Agent, or Firm* — Westerman, Hattori, Daniels & Adrian, LLP (57) ABSTRACT

Mobile control unit comprising:
first communication elements (COM1) adapted for communication according to a local protocol (P1); second communication elements (COM2) adapted for communication according to a second communication protocol (P2);
elements (IHM, MEM, Rx_COM2, Rx_COM1) of detecting at least one event (EVT) involving the sending of at least one message (MSG) to at least one electrical equipment item (11, 12, 13, 14, GTW);
elements (µP, MEM, COM1, COM2, IHM) of automatically selecting the communication elements (COM_TX) to be used for the sending of the at least one message (MSG); and
elements (µP, MEM, COM1, COM2) of generating the at least one message (MSG) according to the event (EVT) detected and the selected communication elements (COM_TX).

22 Claims, 5 Drawing Sheets

(52) U.S. Cl.
CPC ....... *H04L12/2818* (2013.01); *H04L 12/2825* (2013.01); *H04L 12/2827* (2013.01); *H04W 4/22* (2013.01); *H04W 12/08* (2013.01); *H04W 84/10* (2013.01); *H04W 88/02* (2013.01)

(56) References Cited

U.S. PATENT DOCUMENTS

| | | | |
|---|---|---|---|
| 7,027,416 B1* | 4/2006 | Kriz | G01D 21/00 370/328 |
| 7,237,029 B2 | 6/2007 | Hino et al. | |
| 8,792,826 B2 | 7/2014 | Willis | |
| 2002/0069276 A1 | 6/2002 | Hino et al. | |
| 2004/0042462 A1* | 3/2004 | O'Neill | H04J 3/1611 370/395.5 |
| 2009/0156126 A1 | 6/2009 | Willis | |
| 2009/0156141 A1 | 6/2009 | Sulc | |
| 2015/0116811 A1* | 4/2015 | Shrivastava | G08C 17/02 359/275 |
| 2015/0181549 A1* | 6/2015 | Batada | H04W 4/04 455/456.1 |

* cited by examiner

MOBILE UNIT FOR CONTROLLING THE COMFORT AND/OR SECURITY CONDITIONS IN A BUILDING

FIELD OF THE INVENTION

The present invention relates to the field of the control of security and/or comfort equipment items in a building. It relates in particular to a control unit for the electrical equipment of the building and a method for operating the control unit in an installation for the automated control of the devices driving such equipment items.

BACKGROUND ART

The proliferation of the functionalities offered by the electrical equipment items of the building, and the proliferation of the products to be controlled, lie behind the existence of control units that have highly complex user interfaces. This means that the users have to spend a long learning time before managing to optimally implement the various functionalities. Some control units can control the electrical equipment items according to complex scenarios stored in the memories of the control units.

The control units and the communication devices controlling the electrical equipment items form a local area network in the building, and communicate within this network via local communication protocols. This communication is limited by the range of the communication elements used. Once the control unit is away from the building, the controlling of the electrical equipment items by the same control unit is no longer possible. A user will no longer be able to benefit from his or her knowledge of the ergonomics of the control unit and the automatic controlling using the scenarios stored in the memories of the control unit is no longer possible.

SUMMARY OF THE INVENTION

The present invention proposes a control unit and an operating method that make it possible to remedy these drawbacks.

From the prior art, inventions are known that propose devices, such as mobile telephones or multimedia tablets, that make it possible to develop specific applications for controlling the electrical equipment items of the building.

This solution leads to duplicating the learning efforts for a user and the development, test and integration effort for the programming of the controlling scenarios.

These devices, provided with communication means using standardised protocols, such as Bluetooth, 802.11, etc., are not adapted to communicate according to proprietary protocols which can vary from one home automation network to another. Whether they are remote from or within range of the electrical equipment items with which they have to communicate, these devices always need one or more additional equipment items to "translate" the messages sent according to the standardised protocol into messages conforming to the proprietary protocol specific to the home automation installation. In the case of use within the installation, in proximity to the electrical equipment items, such an operation causes additional energy consumption and a cluttering of the radio environment. Another known solution is to provide the electrical equipment items with communication means using the standardised protocols, which leads to an increase in the cost of the installation and in the operating cost if the standardised protocols are of fee-paying type (SIM card type).

According to a first aspect, the invention relates to a mobile control unit, intended to be used in an installation for the automated control of the comfort and/or security conditions in a building. The installation comprises at least one electrical equipment item adapted for communication according to a first communication protocol, called local protocol.

According to the invention, the mobile control unit comprises
  first communication elements adapted for communication according to the local protocol;
  second communication elements adapted for communication according to a second communication protocol, called remote protocol, allowing access to an external network;
  elements for detecting at least one event involving the sending of at least one message to at least one electrical equipment item;
  elements for automatically selecting the communication elements to be used for the sending of the at least one message;
  elements for generating the at least one message according to the event detected and the selected communication elements.

The installation does not form part of the mobile control unit.

Such a control unit communicates with the electrical equipment items of the building, regardless of its position, in proximity to the electrical equipment items to be controlled, according to the local protocol, or remotely, according to the remote protocol, while benefiting from a single user interface and allowing the use of the existing scenarios without reprogramming them, and allowing for an optimisation of the transmissions. The mobile unit according to the invention can react to different events and send messages to the electrical equipment items, in just one manner from the point of view of a user. This is possible by virtue of the two communication elements available and the automatic selection of the communication elements used for the sending of the messages. The automatic selection is performed by the control unit. The automatic selection is performed seamlessly for the user or without the intervention of the user. This functionality makes the control unit a "mobile" control unit, able to operate even if it is moved far away from the electrical equipment items to be controlled. It is important to note that, between two sendings of messages, the control unit can automatically change elements and communication protocol.

Correlatively, the invention relates to an installation for the automated control of the comfort and/or security conditions in a building, comprising a mobile control unit according to the invention and at least one electrical equipment item adapted to communicate according to the local protocol.

Advantageously, in such an installation, the first and second communication elements of the control unit allow for the establishment of the connections between the different electrical equipment items of the installation and an external computer network. The external network is accessed from an element belonging to the installation, unlike in the existing solutions.

The invention relates also to an operating method in an installation as mentioned, the method being implemented by the mobile control unit, that is to say a method for operating the mobile control unit. The method comprises a step of detecting at least one event involving the sending of at least one message to at least one electrical equipment item of the installation;

a step of automatically selecting the communication elements to be used for the sending of the at least one message to the at least one electrical equipment item;

a step of generating the at least one message according to the event detected and the communication elements selected for the sending of the message;

a step of sending the at least one message via the communication elements selected.

In one embodiment, the mobile control unit can comprise elements for determining at least one action to be executed by the at least one electrical equipment item, according to the event detected. Thus, a "smart" control unit can interpret the events detected and deduce the commands to be sent to the electrical equipment items to trigger the execution of the desired actions by the electrical equipment items.

The control unit can comprise human-machine interface elements, making it possible for a user to select commands to be sent to the at least one electrical equipment item. This embodiment, particularly advantageous for the complex control units and/or control units with customised ergonomics, enables a user, familiar with a particular ergonomy, to send the manual commands in the same way, regardless of where he or she is located and regardless of the protocol used.

In one embodiment, the elements for automatically selecting the communication elements can comprise geolocation elements.

An installation according to the invention can comprise a communication gateway device comprising communication elements adapted to the local protocol, communication elements adapted to a third communication protocol allowing access to the external network, and elements for converting the data received in accordance with the third communication protocol into a format compatible with the local protocol.

Advantageously, the presence of the communication gateway makes it possible to route messages from the control unit to the electrical equipment items and vice versa, regardless of the position of the control unit in relation to the installation. In effect, if the control unit and the equipment items are out of range for a communication according to the local protocol, the second communication elements, the external network and the gateway allow for an alternative routing of the messages between the control unit and the electrical equipment items. Thus, the network of electrical equipment items becomes a mobile network.

The installation can further comprise a device for accessing the external network, adapted to communicate with the control unit according to the remote protocol.

In one embodiment, the operating method can comprise a step of determining at least one action to be executed by the at least one electrical equipment item, according to the event detected.

The operating method can comprise a step of receiving a report message containing information relating to the result of the reception of the at least one message by the at least one electrical equipment item.

Thus, knowing the result of the reception of a message, the control unit can determine, without intervention from the user, how to proceed: resend the message, display information, generate other messages to the electrical equipment items of the installation, or simply wait for new events.

The operating method can comprise a step of automatically selecting the elements for receiving the report message. Advantageously, the automatic selection of the receiving elements makes it possible to receive, seamlessly for the user, reception reports, regardless of the distance between the control unit and the installation. It should be noted that this distance can change between the moment of the sending of a message and that when the report associated with this message is received.

In one embodiment, the elements for receiving the report message are the communication elements selected for the sending of the message.

In one embodiment, the step of automatic selection comprises a sub-step of testing the connection using the local protocol, in order to set up a direct communication with the at least one electrical equipment item, the selected communication elements being the first communication elements in the case of successful establishment of the direct communication;

the second communication elements, in the case of failure to establish the direct communication.

In another embodiment, the step of automatic selection comprises a sub-step of geolocation of the mobile control unit, the selected communication elements being the first communication elements if the control unit is located within a predefined perimeter;

the second communication elements, otherwise.

In one embodiment, the step of detecting the at least one event comprises the detection of at least one user action executed via a human-machine interface. Advantageously, this embodiment enables the user to benefit from his or her learning of the ergonomics of the control unit, regardless of the position of the control unit.

In another embodiment, the step of detecting the at least one event comprises the detection of the timing-out of at least one action to be executed in accordance with a predefined scenario. This embodiment makes it possible to exploit the installed scenarios, regardless of the position of the control unit. Thus, the operation of the installation is the same, without requiring any duplication of the scenarios on another control device.

In another embodiment, the step of detecting the at least one event comprises the reception, via the communication elements, of data concerning the operation of at least one electrical equipment item. Advantageously, the control unit can receive information concerning an event detected by the other elements of the installation, or operating setpoints sent by a remote server.

In one embodiment, the action to be executed by the at least one electrical equipment item consists in updating its configuration parameters. The operating method implemented by the control unit comprises in this case:

a step of generating a message requesting configuration parameters, to a remote server, in a format compatible with the remote protocol;

a step of transmitting the request message via the second communication elements;

a step of receiving, from the remote server, a message containing configuration parameters, via the second communication elements;

a step of converting the content of the message received in accordance with the remote protocol into a response message compatible with the local protocol.

In one embodiment of the operating method, the data received via the second communication elements relate to a device allowing access to the external network, and the message to be sent to the at least one electrical equipment item contains a command to trigger an action of the electrical equipment item, according to the data received. Advantageously, this feature enables the control unit to notify a user of the events concerning the access device, based on a predefined mapping between the events concerning the access device on the one hand, and the commands to be sent by the control unit, as well as the electrical equipment items receiving these commands on the other hand.

The invention relates also to a communication method in an installation according to the invention, the method being implemented by a device for accessing the external network, adapted to communicate with the control unit according to the remote protocol. This method comprises
 a step of generating data relating to the access device;
 a step of sending these data via the second communication elements to the control unit U_CMD.

Advantageously, the access device can signal events concerning it, via the electrical equipment items of the network, and do so without using communication elements specific to the installation.

This communication method can be seen as an operating method of the access device.

The invention relates also to a computer program comprising instructions suitable for implementing the steps of the operating method according to the invention.

Another object of the invention is a computer-readable information medium, comprising instructions of a computer program as mentioned above.

BRIEF DESCRIPTION OF THE DRAWINGS

Other features and advantages of the present invention will emerge from the description given below, with reference to the figures which illustrate totally non-limiting exemplary embodiments.

DETAILED DESCRIPTION OF PARTICULAR EMBODIMENTS

A first embodiment will now be described with reference to FIGS. 1, 2 and 3.

Figure 1:
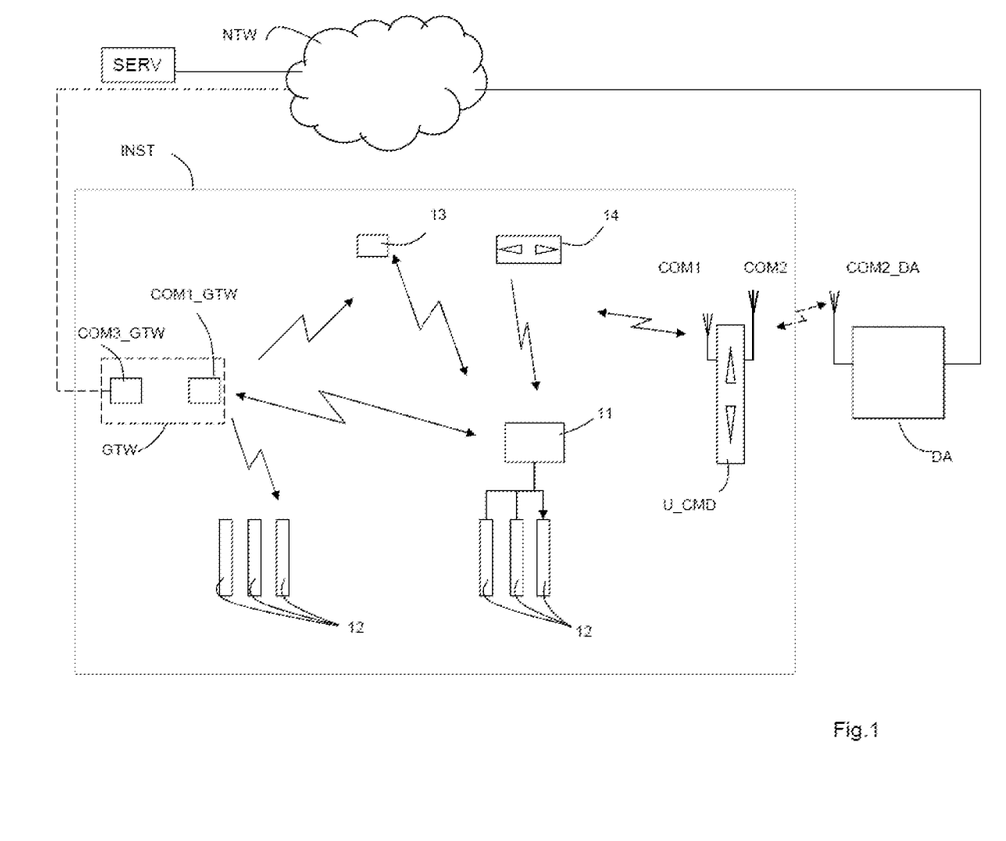
FIG. 1 illustrates an installation according to the invention. Optional elements are represented by dotted lines.

FIG. 1 represents an installation INST according to the invention. This installation comprises equipment items 12 for the automated control of the comfort and/or security conditions in a building, units for the automatic control of these equipment items 11, sensors 13 (such as brightness, temperature, wind sensors), manual control units 14 for the equipment items. The installation can also comprise a communication gateway device GTW, the role of which will be described below in this document.

The equipment items 12 for the automated control of the comfort and/or security conditions in a building can be screens, for example indoor or outdoor blinds, doors and gates, heating, air conditioning, lighting and alarm equipment items.

Hereinafter in the document, the equipment items 12 for the automated control of the comfort and/or security conditions in a building, the control units 11 and 14, the sensors 13 and the communication gateway device GTW will be referred to by the generic term of electrical equipment items.

Within the installation INST, the electrical equipment items intercommunicate by using a first communication protocol P1, called local protocol. The messages exchanged between the different equipment items can be transmitted directly, or relayed via an intermediate element belonging to the installation; in all cases, the protocol used is the same, thus making it possible to use the same transmission/reception communication means and the same protocol stack, regardless of the routing of a message. Some electrical equipment items can be solely transmitters, others solely receivers, and others transmitters and receivers.

This local protocol can comprise the use of an identifier of the installation INST, called "house key", shared by all the electrical equipment items of the installation. This key, stored in each equipment item upon the commissioning of the installation or upon the addition of a new equipment item, ensures the security of the exchanges. Only the equipment items provided with one and the same "house key" are authorised to intercommunicate.

Figure 2:
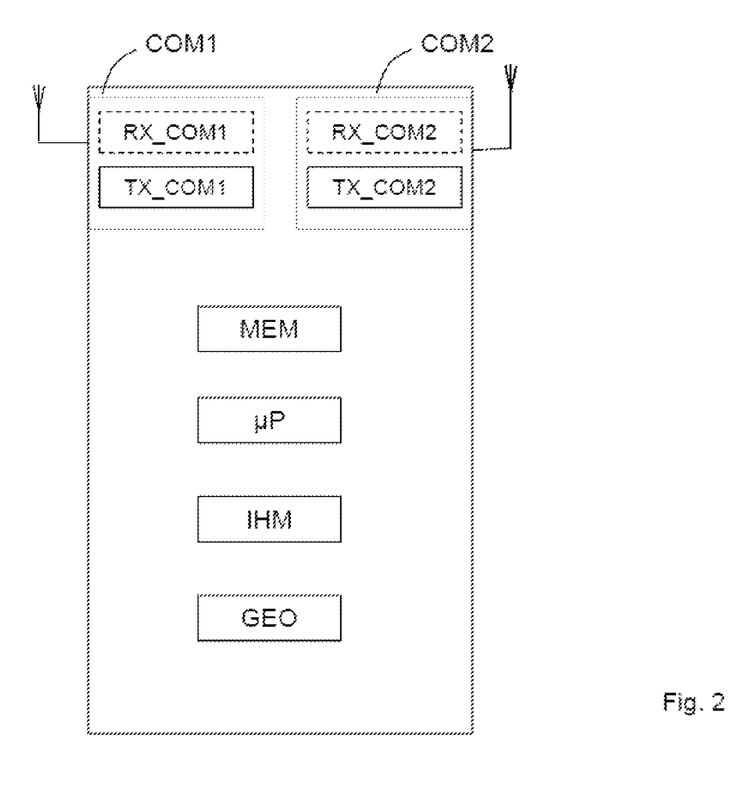
FIG. 2 represents a control unit according to the invention.

The installation INST comprises a mobile control unit U_CMD according to the invention, represented notably in FIG. 2. This control unit U_CMD comprises first communication elements COM1 adapted to the local protocol P1, that can thus communicate with the electrical equipment items 11, 12, 13, 14, GTW, in the installation INST according to this local protocol. The exchanges can be performed with the equipment items 12 for the automated control of the comfort and security conditions, to send control messages; with the sensors 13, to obtain the results of the detections; with other control units 11, 14, to exchange maintenance or configuration messages; with the gateway device GTW, for example when commissioning this gateway.

The control unit U_CMD, belonging to the installation INST, is provided with the "house key".

The control unit U_CMD also comprises second communication elements COM2 adapted to a second communication protocol P2 allowing access to an external computer network NTW called remote protocol. This protocol is preferably a protocol that is widely used and implemented by a large number of communicating terminals, such as mobile telephones, computers, multimedia tablets. The remote protocol can be wired, for example a USB, UART link, or wireless, for example Bluetooth, Wi-Fi, GPRS, UMTS, etc.

Generally, the mobile control unit U_CMD, provided with the second communication elements COM2, can establish a communication with a communicating terminal. According to known methods, certain communicating terminals implement applications of "access point" type providing the connected devices with an access service to an external network NTW. It is important to note that such "access point" applications are not specific to the installation. Hereinafter in this document, such a communicating terminal, implementing an application of "access point" type, will be called access device DA.

Thus, the control unit can access an external network NTW via the access device DA, and establish a communication with an external server SERV, to exchange data concerning the operation of the installation INST and the electrical equipment items.

The control unit U_CMD also comprises
- elements IHM, MEM, Rx_COM2, Rx_COM1 for detecting at least one event EVT involving the sending of at least one message MSG to at least one electrical equipment item 11, 12, 13, 14, GTW;
- elements μP, MEM, COM1, COM2, IHM, GEO for automatically selecting the communication elements COM_TX to be used for the sending of the messages MSG;
- elements μP, MEM, COM1, COM2 for generating the at least one message MSG according to the event EVT detected and the selected communication elements COM_TX.

Typically, the application content of a message MSG will be determined according to the event EVT detected, and the frame format according to the communication elements COM_TX, selected for the transmission. Depending on the different protocols used, a plurality of messages may be grouped in one and the same frame, or just one message may be sent per frame. Thus, one and the same event EVT involving the sending of the three messages can, for example, trigger the sending of a single frame containing the three messages if the second communication elements COM2 are selected, or the sending of three frames, each containing one message, if the first communication elements COM1 are selected.

Figure 3:
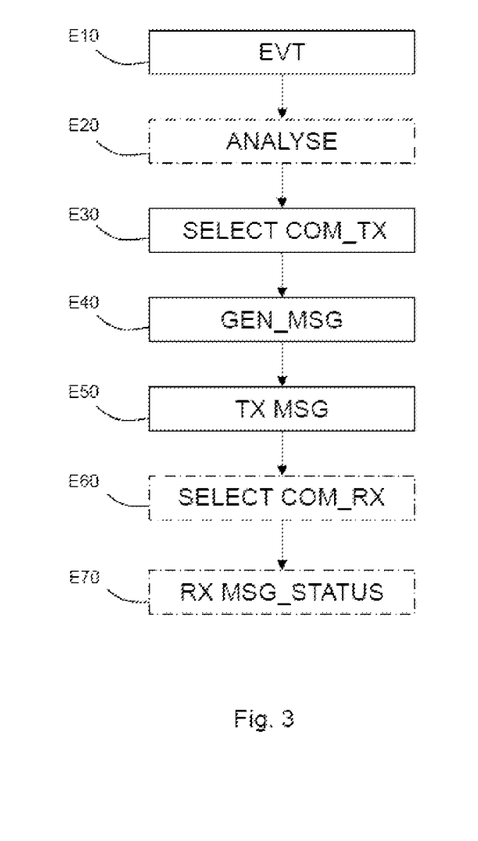
FIG. 3 represents, in flow diagram form, the main steps of a communication method according to one embodiment of the invention. Optional steps are represented by dotted lines.

There now follows a description, with reference to FIG. 3, of the main steps of a communication method according to one embodiment of the invention.

This embodiment is implemented in an installation INST comprising a communication gateway device GTW. This gateway device GTW comprises
- communication elements COM1_GTW, adapted to the local protocol P1;
- communication elements COM3_GTW, adapted to a third communication protocol IP allowing access to the external network NTW; and
- elements for converting the data received in accordance with the third communication protocol IP into a format compatible with the local protocol P1.

Such a device is present in the home automation installation to allow communication with remote servers, for example for downloading configuration parameters of the installation or of the individual equipment items, for remote maintenance or control from this server. To perform these functions, the communication gateway device GTW implements known conversion methods between the local protocol and the IP communication protocol allowing access to the external network NTW.

The control unit detects, in a step E10, at least one event EVT involving the sending of at least one message MSG to at least one electrical equipment item 11, 12, 13, 14 of the installation INST.

Such an event EVT can consist of an action on the part of the user on the human-machine interface IHM. This interface can, as is known, comprise dedicated keyboard keys, or a touch screen, allowing commands to be displayed in the form of specific icons, or even a motion sensor.

Next, the control unit U_CMD can, in an optional step E20, determine at least one action to be executed by the at least one electrical equipment item 11, 12, 13, 14, GTW.

Advantageously, the control unit is responsible for generating the messages according to the events detected. Thus, changes in the operating conditions detected or communicated to the control unit result in the execution of the actions by the electrical equipment items. In effect, the control unit interprets the events, deduces the desired actions, and generates messages to the equipment items concerned. This feature is particularly advantageous, because it allows the equipment items which cannot communicate directly with a sensor, or with other sources of information, to be adapted to the changes detected by other equipment items of the installation, or by the control unit. The operation of the equipment items is adapted, but this does not require intervention on the equipment items. In effect, they continue to execute actions according to the messages received, and it is the control unit which handles the generation and the sending of the messages.

Then, in a step E30, the control unit U_CMD performs an automatic selection of the communication elements COM_TX to be used to send the message MSG to the electrical equipment item 11, 12, 13, 14, GTW.

Figure 5A:
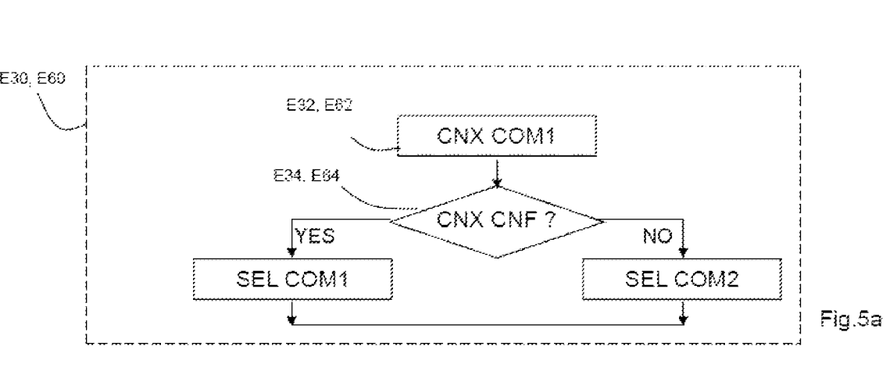
FIGS. 5a, 5b, 5c and 5d illustrate the main sub-steps of a step of automatically selecting the communication elements, according to particular embodiments of the invention.
Figure 5B:
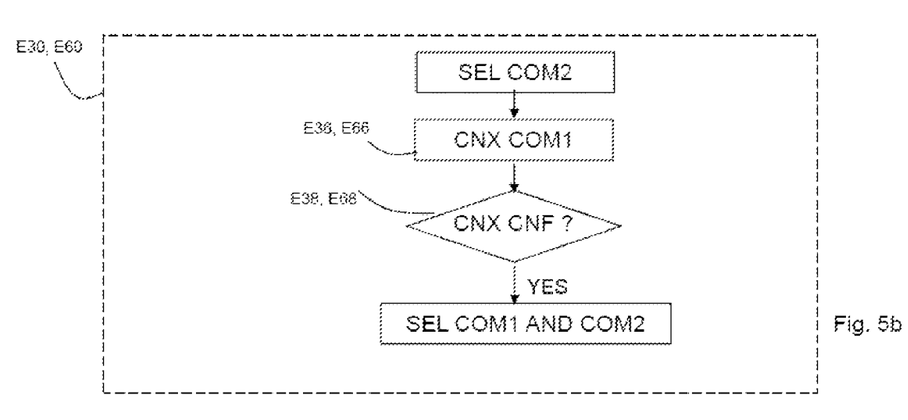
Figure 5C:
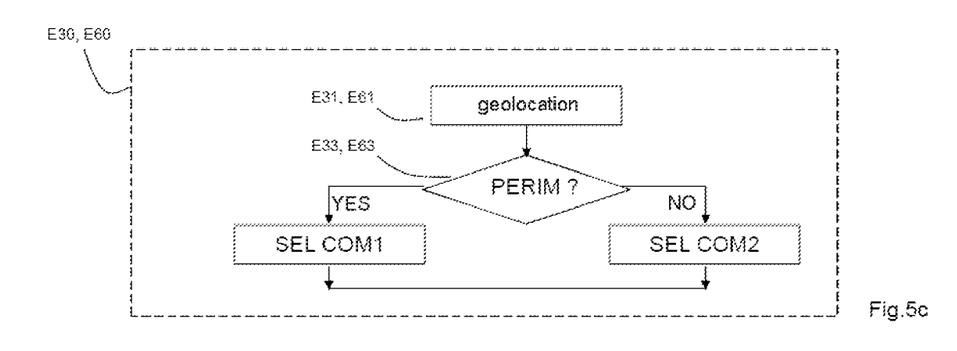

An automatic selection mode, based on the geolocation of the control unit U_CMD, is illustrated by FIG. 5c.

The control unit determines, in a sub-step E31, its location relative to a perimeter PERIM predefined according to the location of the installation INST and the range of the first communication elements COM1. Within this perimeter PERIM, the control unit U_CMD, located within range of the first communication elements COM1, can communicate according to the local protocol P1.

The result of the geolocation is analysed during a step E33, and the control unit U_CMD selects the first communication elements COM1 if it is located within the predefined perimeter PERIM, and the second communication elements COM2 otherwise.

The control unit can obtain such information by geolocation elements forming part of the control unit; alternatively, this information can be received via the second communication elements COM2, from an external device, such as a mobile telephone.

Another automatic selection mode, based on establishing a direct communication with the electrical equipment items 11, 12, 13, 14, GTW, will now be described with reference to FIG. 5a.

The selection of the communication elements based on a confirmation of the establishment of the connection is particularly reliable. Within the meaning of the invention, a direct communication uses the local protocol P1 and the first communication elements COM1 for the sending of a message by the control unit U_CMD to the electrical equipment items 11, 12, 13, 14, GTW. As will be explained hereinafter in the document, the successful establishment of the direct communication can consist of a message received by the control unit U_CMD via the first or second communication elements.

In a sub-step E32, the control unit U_CMD tries to establish a direct communication with the electrical equipment item concerned. The communication elements are selected according to the result of the establishment of the direct communication, analysed in a sub-step E34. Thus, the first communication elements COM1 are selected in the case of success, and the second communication elements COM2, in the case of failure to establish the direct communication.

During the sub-step E32, the control unit U_CMD can send, in order to establish the direct communication using the local protocol P1, an explicit connection request message. This request can be made, for example, at the data link layer level, or at the data transport layer level, in an embodiment using a data transport layer in the so-called "connected" mode, such as TCP in the internet protocol. The reception of a connection confirmation message is interpreted as a successful establishment of the direct communication, and consequently, during the sub-step E34, the first communication elements COM1 are selected by the control unit U_CMD for the sending of the message MSG to the electrical equipment item 11, 12, 13, 14, GTW.

If no connection confirmation message is received, the establishment of the direct communication is considered to have failed, and consequently, during the sub-step E34, the second communication elements COM2 are selected by the control unit U_CMD for the sending of the messages MSG to the electrical equipment items 11, 12, 13, 14, GTW.

Alternatively, during the sub-step E32, the control unit U_CMD can, directly via the first communication elements COM1, send the message MSG, following the detection of the event EVT. Thus, the connection test using the local protocol P1 is performed implicitly.

If the control unit U_CMD receives a report message MSG_STATUS sent by the electrical equipment item 11, 12, 13, 14, GTW that was the recipient of the message MSG, the establishment of the direct communication is considered to be successful, and consequently, during the sub-step E34, the first communication elements COM1 are selected by the control unit U_CMD. Otherwise, the establishment of the direct communication is considered to have failed, and the second communication elements COM2 are selected by the control unit U_CMD for the sending of the messages MSG to the electrical equipment items 11, 12, 13, 14, GTW.

If the local protocol is bidirectional, the reception of the connection confirmation message or of the report message MSG_STATUS expected following the sending of the message MSG, can take place via the first communication elements COM1.

If the local protocol is one-way, or if the electrical equipment items 11, 12, 13, 14 are only suitable for receiving messages according to this local protocol, the establishment of the direct communication can be confirmed by an analysis device distinct from the electrical equipment items that are the recipients of the messages.

This analysis device, suitable for receiving messages according to the local protocol P1, is placed in reception conditions similar to the reception conditions of the electrical equipment items 11, 12, 13, 14 that are the recipients of the messages sent by the control unit U_CMD.

When a message MSG is sent by the control unit U_CMD to one or more electrical equipment items, in accordance with the local protocol P1, the analysis device estimates the probability of good reception of the messages by their recipients, based on its own conditions of reception of these same messages.

The result of this estimation is then sent to the control unit U_CMD. The communication elements used by the control unit U_CMD to receive the result of the estimation can be the first communication elements or the second communication elements COM1, COM2, or other elements, specific to a communication between the analysis device and the control unit U_CMD.

A selection of the communication elements COM1, COM2 in mutually exclusive mode, according to the result of the test of establishment of a direct communication via the first communication elements COM1, presents the advantage of optimising the resources of the control unit U_CMD and of other devices of the installation INST, in terms of computation time and energy consumed.

Whatever the automatic selection mode used, the control unit comprises the hardware and software means for itself to perform this selection of the communication elements COM_TX to be used for the sending of the messages MSG to the electrical equipment items of the installation INST.

Even in the cases where an interaction with another element of the installation is required, this other element operates according to its normal operating mode, without requiring an adaptation to participate in the automatic selection. Thus, an electrical equipment item 11, 12, 13, 14 operates according to the local protocol of the installation.

In the particular case of the communication gateway device GTW, the conversion function between the local protocol and the communication protocol IP allowing access to the external network NTW remains the same, that is to say a message received from the external network NTW will be decoded and then encoded according to the local protocol and sent to the recipient electrical equipment item; a message received from an electrical equipment item of the installation according to the local protocol is decoded and then encoded according to the third communication protocol IP allowing access to the external network NTW. The conversion is implemented independently of the automatic selection performed by the control unit U_CMD. If the conversion is performed when implementing the invention, the conversion phase will follow the automatic selection, if the second communication elements COM2 are selected by the control unit U_CMD.

The control unit U_CMD will generate the message MSG during a step E40, the frame content and format being chosen according to the event EVT detected and the communication elements COM_TX, selected for the sending of the message.

The message or messages MSG are sent by the control unit in a step E50.

If the second communication elements COM2 are selected during the step E30, the message or messages MSG are sent by the control unit U_CMD via the second communication elements COM2, and then routed via the external network NTW to the gateway device GTW, using known addressing and routing techniques.

The gateway device GTW can thus receive, via the communication elements COM3_GTW, this message or these messages MSG and perform a conversion of the messages MSG received in a format conforming to the third protocol IP, into a format compatible with the local protocol P1.

The messages MSG will then be transmitted to the recipient electrical equipment items by the communication gateway device GTW, in accordance with the local protocol P1. The latter therefore receive the messages MSG in the same way, regardless of the protocol and the sending format used by the control unit U_CMD.

It is important to note that the format used by the control unit U_CMD to communicate via the second communication elements COM2, and that used by the gateway device GTW to communicate via the communication elements COM3_GTW, are not necessarily the same. Any necessary conversion is performed by the external network NTW, according to known modalities.

Generally, an automatic selection is performed for the communication elements COM_TX to be used for the sending of the message MSG to the at least one electrical equipment item, in the step E30.

Following the sending of the message MSG, one or more report messages MSG_STATUS, containing information INF relating to the result of the reception of the message MSG by an electrical equipment item, can be sent by the electrical equipment items 11, 12, 13, 14, GTW, via the first communication elements COM1. Such a message may be a message acknowledging the correct reception of the message MSG, or a report of execution of the application commands sent by the control unit U_CMD, an indication concerning the status of the electrical equipment items 11, 12, 13, 14, GTW, or even identifiers of the equipment items or software and hardware versions of these equipment items.

These messages, sent by the electrical equipment items 11, 12, 13, 14 in accordance with the local protocol P1, can be received directly by the first communication elements COM1 of the control unit U_CMD, or indirectly, via the gateway device GTW, the external network NTW and the second communication elements COM2. In effect, the gateway device GTW can receive, from the electrical equipment items 11, 12, 13, 14, messages conforming to the local protocol P1, and then convert them into a format compatible with the external network NTW. These messages will be routed by the external network NTW to the access device DA and then transmitted in accordance with the remote protocol P2 to the control unit U_CMD.

In one embodiment, the communication elements to be used for the reception of the response messages are selected in an optional step E60.

In a mode of automatically selecting the reception elements, based on the geolocation of the control unit U_CMD, the step E60 comprises sub-steps E61, E63, similar to the sub-steps E31, E33 already described.

In one mode of automatically selecting the reception elements, based on the establishment of a direct communication with the electrical equipment item concerned, the step E60 comprises a connection test sub-step E62 using the local protocol P1, with a view to establishing a direct communication with the electrical equipment item. As already described, the control unit U_CMD sends, via the first communication elements COM1, an explicit connection request message, or, directly, an application message MSG. Then, in a sub-step E64, if a message is received from the electrical equipment item 11, 12, 13, 14, GTW, via the first communication elements COM1, the latter will be selected by the control unit for the reception of the messages; otherwise, the second communication elements COM2 will be selected.

It is important to note that the automatic selection step can be performed independently for the sending and receiving communication elements. This is particularly useful if the location of the control unit (and of the user) changes between the time of sending of the command and the time marking the start of the wait for the report message. For example, in the case of an access control unit, a close command is sent to the security electrical equipment items, via the communication elements COM1, when the control unit is located in proximity to the installation INST. The user sends this command on leaving the building and moves away during the time of execution of the command; it can then receive the report via the second communication elements COM2, in a seamless manner for the user.

Other embodiments of the automatic selection will now be described.

One embodiment, based on a test of establishment of a direct communication with the at least one electrical equipment item, is illustrated by FIG. 5b. The second communication elements COM2 are selected regardless of the result of the direct connection test, to which are added the first communication elements COM1, if the direct communication is successfully established.

Figure 5D:
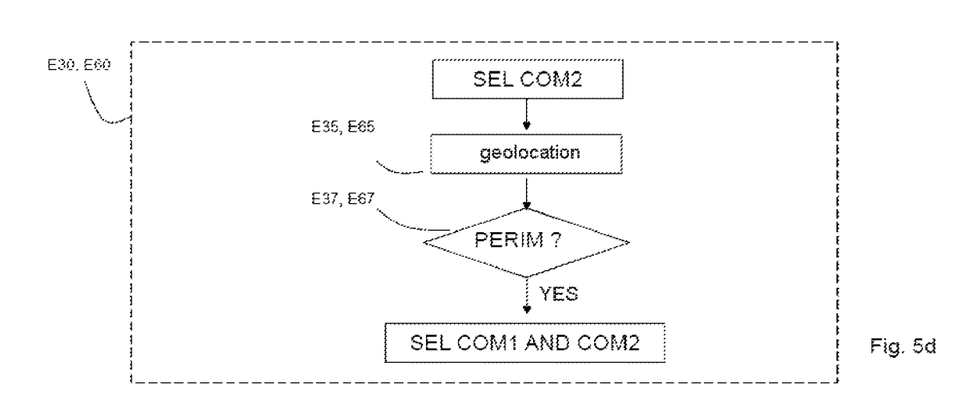

Similarly, in another embodiment, using the geolocation of the mobile control unit U_CMD and illustrated by FIG. 5d, the second communication elements COM2 are selected regardless of the result of the geolocation, to which are added the first communication elements COM1, if the mobile control unit U_CMD is located within a predefined perimeter PERIM, in proximity to the installation. This perimeter PERIM can be defined relative to the range of the first communication means COM1 and the location of the building.

In certain predefined cases, the automatic selection step consists in automatically selecting, without the intervention of the user in this selection, the first and the second communication elements. Thus, the sending is done via both communication elements. The selection step is thus simplified and the reliability of the communication increased in certain cases. In this embodiment, a systematic return channel is assured, at least via the second communication elements.

The operation of the control unit U_CMD, as seen by a user, is the same, regardless of the communication elements COM1, COM2 used following the automatic selection performed by the control unit U_CMD. Advantageously, one and the same action on the part of the user on the control unit in order to provoke, on an equipment item, the execution of a given action or command, provokes, depending on circumstances, notably depending on the location of the control unit, the sending from the control unit of a first message according to the first protocol or the sending from the control unit of a second message according to the second protocol. Although the first and second messages may be of different forms, they have the same sense or the same meaning. They both reflect a request to execute a given action or a given command on the equipment.

Other examples of events EVT that can be detected by the control unit U_CMD in the step E10 will now be described.

Such an event EVT can consist of the timing-out of at least one action to be executed in accordance with a predefined scenario. This event consists in the detection of a condition that is fulfilled (temperature, brightness), or simply a time measurement, using an internal clock; this time measurement will be then used to identify predetermined instants of the sending of the messages.

Another event EVT involving the sending of a message MSG to the electrical equipment items 11, 12, 13, 14, GTW, may be the reception, via the communication elements COM1, COM2, of the data DATA1, DATA2 concerning the operation of at least one electrical equipment item 11, 12, 13, 14, GTW.

The data DATA1, DATA2 can contain information sent by sensors 13 of the installation. These data can be used for the conditional sending of the messages MSG to the electrical equipment items. For example, an operating setpoint specifies the starting up of the heating equipment items below a certain temperature; a sensor of the installation sends information relating to the local temperature to the control unit and the latter deduces whether an on/off command has to be sent to the heating equipment item. This functionality is available regardless of the distance of the control unit from the electrical equipment items.

As already explained, these data can be received via the first or the second communication elements, COM1, COM2, according to the location of the control unit, and the range of the first communication elements COM1.

Another advantageous case of use of the invention is the configuration of the electrical equipment items 11, 12, 13, 14, GTW, during works, or during a maintenance operation. This example will now be described with reference to FIGS. 3 and 4.

In this embodiment, the event EVT can be a specific action executed by an authorised user, for example via the interface IHM, and triggering the operation of configuration of the electrical equipment items 11, 12, 13, 14, GTW of the installation INST.

Alternatively, such an operation can be triggered by the reception of the data DATA1, DATA2, sent to the control unit U_CMD by a configuration tool, via reception ports Rx_COM1, Rx_COM2 of the first or the second communication elements COM1, COM2.

These data DATA1, DATA2 can also be sent by an electrical equipment item to provoke a configuration or diagnostic operation, for example in the case of a defective self-test result, or indicate the deadline for a preprogrammed update.

The electrical equipment item uses the local protocol P1 to send a configuration or diagnostic request; the control unit U_CMD receives it via the first communication elements COM1, if it is in proximity to the installation INST. Otherwise, the request is received by the gateway GTW and rerouted via the external network NTW; the control unit U_CMD receives it via the second communication elements COM2.

In this embodiment, the action to be executed, determined in the step E20, is an updating (or an initialisation) of the configuration parameters of the electrical equipment item 11, 12, 13, 14.

The control unit U_CMD can also, during a configuration operation, receive its own operating parameters. In effect, the ergonomy of the control unit can be adapted to the electrical equipment items and to the installation INST.

In another embodiment, in the step E30, the mobile control unit U_CMD tries to establish a direct communication with a communication gateway device GTW.

During the commissioning phase of the installation INST, the communication gateway device GTW is not present in the installation, or is not yet commissioned. The control unit U_CMD, located during the commissioning phase in the installation INST, in range of the first communication means COM1, automatically selects, in the step E30, the first communication elements COM1 to send messages to the electrical equipment items 11, 12, 13, 14, GTW.

The control unit U_CMD will use its second communication elements COM2 to connect, via the access device DA and the external network NTW, to the server SERV. Thus, the control unit U_CMD provides a communication gateway function between the electrical equipment items 11, 12, 13, 14, GTW.

Alternatively, the automatic selection can be done by the control unit U_CMD according to the application to be executed. Thus, if a configuration operation is authorised only within the installation INST, for security reasons, the control unit U_CMD will select the first communication elements COM1 to send messages to the electrical equipment items.

Figure 4:
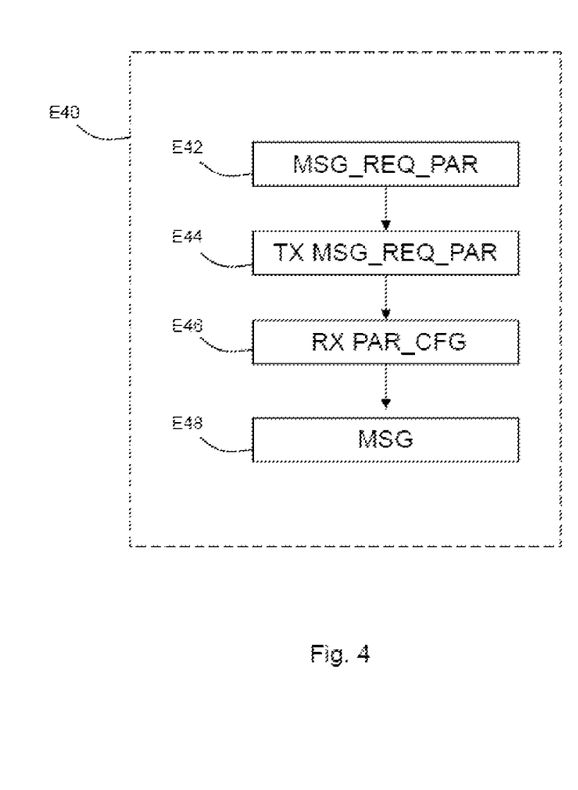
FIG. 4 illustrates the main sub-steps of a step of generating a message, that can be implemented in a particular embodiment of the invention.

There now follows a description, with reference to FIG. 4, of the step E40 of generation of the message or messages MSG to the electrical equipment items.

In a first sub-step E42, the control unit U_CMD generates a configuration request message to the remote server SERV, in a format compatible with the remote protocol P2.

In a second sub-step E44, the control unit U_CMD sends the parameter request message, via the second communication elements COM2, to the remote server SERV, and receives, during a sub-step E46, the message or messages containing the configuration parameters of the equipment items 11, 12, 13, 14, GTW. As already mentioned, these two sub-steps, E44 and E46, are executed using the second communication elements COM2.

Then, during a sub-step E48, the duly obtained data are used for the generation of the message MSG to the electrical equipment items, in a format corresponding to the communication elements selected COM_TX during the step E30, in this example the first communication elements COM1.

In this embodiment, if a message is expected in return, the communication elements COM_RX, selected for reception, are the same elements as the elements COM_TX, selected for the sending of the message MSG.

In another embodiment, a maintenance or configuration operation can also be initiated by a user. This embodiment can be implemented in an installation INST, comprising an access device dedicated to the installation, DA_INST. The latter is a communicating terminal, such as a mobile telephone, which, in addition to the known application of "access point" type, is adapted to execute an application specific to the installation. For example, during a telephone call made by a user to the after-sales services, the specific application running on the dedicated access device DA_INST, establishes a data connection between an after-sales services server and the electrical equipment item concerned. To this end, the access device DA_INST connects to the control unit U_CMD, to reach the electrical equipment item. The control unit U_CMD receives the connection establishment message, which constitutes an event EVT within the meaning of the invention, via the second communication elements COM2.

In another embodiment, an access device DA_INST dedicated to the installation can provide greater security, through a prior pairing with the electrical equipment items. It allows for an optimisation of the costs, through dedicated implementations, for example in a portable maintenance tool or by the addition of an application dedicated to a standard device, such as a mobile telephone, a multimedia tablet or a computer. It should be noted that an access device is not necessarily unique to one installation.

In another embodiment, information concerning an access device DA is notified to the user through specific actions executed by electrical equipment items 11, 12, 13, 14, GTW. For this, the access device DA sends the control unit U_CMD data DATA2 relating to its operation or to its status.

The notification is made in actions executed by electrical equipment items. To trigger these actions, the control unit sends messages according to a predefined mapping between the events concerning the access device on the one hand, and the commands to be sent, as well as the equipment items that are the recipients of these commands on the other hand.

For example, if the access device DA is the mobile telephone of a user of the installation INST, an incoming call intended for the telephone can be notified to the user through an action executed by an electrical equipment item, for example the lighting of a lighting equipment item according to a predefined sequence, or by the raising or the lowering of a blind.

The electrical equipment items responsible for the notification, as well as the actions that they have to execute, are predefined according to information concerning the access device DA.

This information is sent by the access device DA in accordance with the remote protocol P2, and its reception, via the second communication elements COM2, constitutes another example of an event EVT within the meaning of the invention.

"Element selection" should be understood to mean that an element is chosen to be used subsequently. The selection of a first element does not necessarily exclude the selection of a second element, and notably does not exclude the first and the second elements from being able to be in a selected state simultaneously. Thus, two elements can be chosen to be used to ensure one and the same task or complementary processes constituting one and the same task. The subsequent uses of the first and second elements can be simultaneous or staggered in time.

The invention claimed is:

1. Mobile control unit, intended to be used in an installation for the automated control of the comfort and/or security conditions in a building, the installation comprising an electrical equipment item adapted for communication according to a first communication protocol, called local protocol,
wherein the mobile control unit comprises:
first communication elements adapted for communication according to the local protocol;
second communication elements adapted for communication according to a second communication protocol, called remote protocol, allowing access to an external network;
elements for detecting at least one event involving the sending of at least one message to an electrical equipment item;
elements for automatically selecting the communication elements to be used for the sending of the at least one message; and
elements for generating the at least one message according to the event detected and the selected communication elements,
wherein the at least one message is adapted to be received by the electrical equipment according to the first communication protocol, whatever the communication protocol used by the mobile control unit.

2. The mobile control unit according to claim 1, wherein the mobile control unit further comprises elements for determining at least one action to be executed by the electrical equipment item, according to the event detected.

3. The mobile control unit according to claim 1, wherein the selection elements further comprise human-machine interface elements, making it possible for a user to select commands to be sent to the electrical equipment item.

4. The mobile control unit according to claim 1, wherein the selection elements further comprise geolocation elements.

5. Installation for the automated control of the comfort and/or security conditions in a building, wherein the installation comprises:
the mobile control unit according to claim 1; and
an electrical equipment item adapted to communicate according to the local protocol,
wherein the at least one message is adapted to be received by the electrical equipment according to the first communication protocol, whatever the communication protocol used by the mobile control unit.

6. The installation according to claim 5, wherein the installation further comprises a communication gateway device comprising:
communication elements adapted to the local protocol;
communication elements adapted to a third communication protocol allowing access to the external network; and
elements for converting the data received in accordance with the third communication protocol into a format compatible with the local protocol.

7. The installation according to claim 5, wherein the installation comprises a device for accessing the external network, adapted to communicate with the mobile control unit according to the remote protocol,
wherein information concerning the device for accessing the external network is notified to the user through specific actions executed by electrical equipment items.

8. Method of operating the installation according to claim 5, the method being implemented by the mobile control unit, and comprising:
detecting at least one event involving the sending of at least one message to an electrical equipment item of the installation;
automatically selecting the communication elements to be used for the sending of the at least one message to the electrical equipment item;
generating the at least one message according to the event detected and the communication elements selected for the sending of the message;
sending the at least one message via the communication elements selected for the sending of the message.

9. The method according to claim 8, wherein the operating method further comprises determining at least one action to be executed by the electrical equipment item, according to the event detected.

10. The method according to claim 8, wherein the operating method further comprises receiving a report message containing information relating to the result of the reception of the at least one message by the electrical equipment item.

11. The method according to claim 10, wherein the operating method further comprises automatically selecting the elements for receiving the report message.

12. The method according to claim 11, wherein the elements for receiving the report message are the communication elements selected for the sending of the message.

13. The method according to claim 8, wherein the step of automatic selection comprises testing the connection using the local protocol, in order to set up a direct communication with the electrical equipment item, the selected communication elements being:
the first communication elements in the case of successful establishment of the direct communication;
the second communication elements, in the case of failure to establish the direct communication.

14. The method according to claim 8, wherein the step of automatic selection comprises geolocating the mobile control unit, the selected communication elements being:
the first communication elements if the control unit is located within a predefined perimeter;
the second communication elements otherwise.

15. The method according to claim 8, wherein the step of detecting the at least one event comprises detecting at least one user action executed via a human-machine interface.

16. The method according to claim 8, wherein the step of detecting the at least one event comprises detecting the timing-out of at least one action to be executed in accordance with a predefined scenario.

17. The method according to claim 8, wherein the of detecting the at least one event comprises receiving, via the communication elements, the data concerning the operation of an electrical equipment item.

18. The method according to claim 17, wherein the data are received via the second communication elements, the data relate to a device allowing access to the external network and the message contains a command to trigger an action of the electrical equipment item, according to the data received.

19. The method according to claim 8, wherein:
the action to be executed by the electrical equipment item consists in updating its configuration parameters; and
the method implemented by the control unit, further comprises:
   generating a message requesting configuration parameters, to a remote server, in a format compatible with the remote protocol;
   transmitting the request message via the second communication elements;
   receiving, from the remote server, a message containing configuration parameters, via the second communication elements; and
   converting the content of the message received in accordance with the remote protocol into a response message compatible with the local protocol.

20. Method of communicating in the installation according to claim 5, implemented by a device for accessing the external network, adapted to communicate with the control unit according to the remote protocol, the method comprising:
   generating data relating to the access device; and
   sending the data via the second communication elements to the control unit.

21. Mobile control unit according to claim 1, wherein between the sending of two messages, the elements for automatically selecting message communication elements switch from one set of elements among the first and second message communication elements to the other set of elements among the first and second message communication elements.

22. The method according to claim 8, comprising, between the sending of two messages, switching from one set of elements among the first and second message communication elements to the other set of elements among the first and second message communication elements.

* * * * *

UNITED STATES PATENT AND TRADEMARK OFFICE
CERTIFICATE OF CORRECTION

PATENT NO. : 9,462,409 B2  Page 1 of 1
APPLICATION NO. : 14/426456
DATED : October 4, 2016
INVENTOR(S) : Pierre Mignot It is certified that error appears in the above-identified patent and that said Letters Patent is hereby corrected as shown below:

Column 16, Line 58:
In Claim 17, Line 1, change:
"the of"
To:
-- the step of --

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*